United States Patent
Wall, III

(10) Patent No.: US 7,860,640 B1
(45) Date of Patent: Dec. 28, 2010

(54) MARKER MEANS FOR DETERMINING DIRECTION AND ZOOM OF A MEANS FOR VIEWING

(76) Inventor: Henry H. Wall, III, 6025 Jessamine, Houston, TX (US) 77081

(*) Notice: Subject to any disclaimer, the term of this patent is extended or adjusted under 35 U.S.C. 154(b) by 0 days.

(21) Appl. No.: 12/703,455

(22) Filed: Feb. 10, 2010

Related U.S. Application Data

(63) Continuation-in-part of application No. 11/360,958, filed on Feb. 24, 2006, now Pat. No. 7,689,347.

(51) Int. Cl.
*G06G 7/76* (2006.01)
(52) U.S. Cl. .................. 701/117; 340/464; 340/990; 235/454; 156/60
(58) Field of Classification Search .......... 701/117, 701/208
See application file for complete search history.

(56) References Cited

U.S. PATENT DOCUMENTS

| | | | |
|---|---|---|---|
| 4,370,718 | A | 1/1983 | Chasek |
| 4,908,615 | A | 3/1990 | Bayraktaroglu |
| 5,444,442 | A | 8/1995 | Sadakata |
| 6,317,058 | B1 | 11/2001 | Lemelson et al. |
| 6,366,219 | B1 | 4/2002 | Hoummady |
| 6,567,748 | B2 | 5/2003 | Matsuno |
| 6,633,238 | B2 | 10/2003 | Lemelson |
| 2001/0043836 | A1 | 11/2001 | Coleman |
| 2003/0189499 | A1 | 10/2003 | Stricklin |
| 2004/0145497 | A1 | 7/2004 | Pearson |
| 2004/0218784 | A1 | 11/2004 | Nichani |
| 2005/0053274 | A1 | 3/2005 | Mayer |
| 2005/0137754 | A1* | 6/2005 | Bartlett ................. 701/1 |
| 2006/0095199 | A1 | 5/2006 | Lagassey |
| 2006/0155427 | A1* | 7/2006 | Yang .................. 701/1 |
| 2006/0200307 | A1 | 9/2006 | Reiss |
| 2006/0200312 | A1 | 9/2006 | Osaka |
| 2007/0171293 | A1 | 7/2007 | Okamoto |
| 2009/0140887 | A1* | 6/2009 | Breed et al. ........... 340/990 |
| 2010/0131185 | A1* | 5/2010 | Morris et al. ......... 701/200 |

OTHER PUBLICATIONS

Han, Jun Wei and Lei Guo, A Shape-Based Image Rerieval Method, Journal Abstract, Signal Processing: Image Communication, Feb. 2003, pp. 141-156, vol. 18, issue 2, Amsterdam.

Tsechpenakis, G. et al, A Snake Model for Object Tracking in Natural Sequences, Journal Abstract, Signal Processing: Image Communication, Mar. 2004, pp. 214-239, vol. 19, issue 3, Amsterdam.

\* cited by examiner

*Primary Examiner*—Khoi Tran
*Assistant Examiner*—Rodney King
(74) *Attorney, Agent, or Firm*—Buskop Law Group, P.C.; Wendy Buskop

(57) ABSTRACT

A system for determining a direction and a magnification of a means for viewing is described herein. The system can have a means for viewing, a marker means, and a processor in communication with a data storage. The means for viewing can have a means for viewing longitude, a means for viewing latitude, a means for viewing height, and a field of view. The system can have a marker means disposed within the field of view, and the marker means can have a certain point, which has a marker means longitude, a marker means latitude, and a marker means height. The marker means can have a first area of a certain shape and of at least one color.

20 Claims, 6 Drawing Sheets

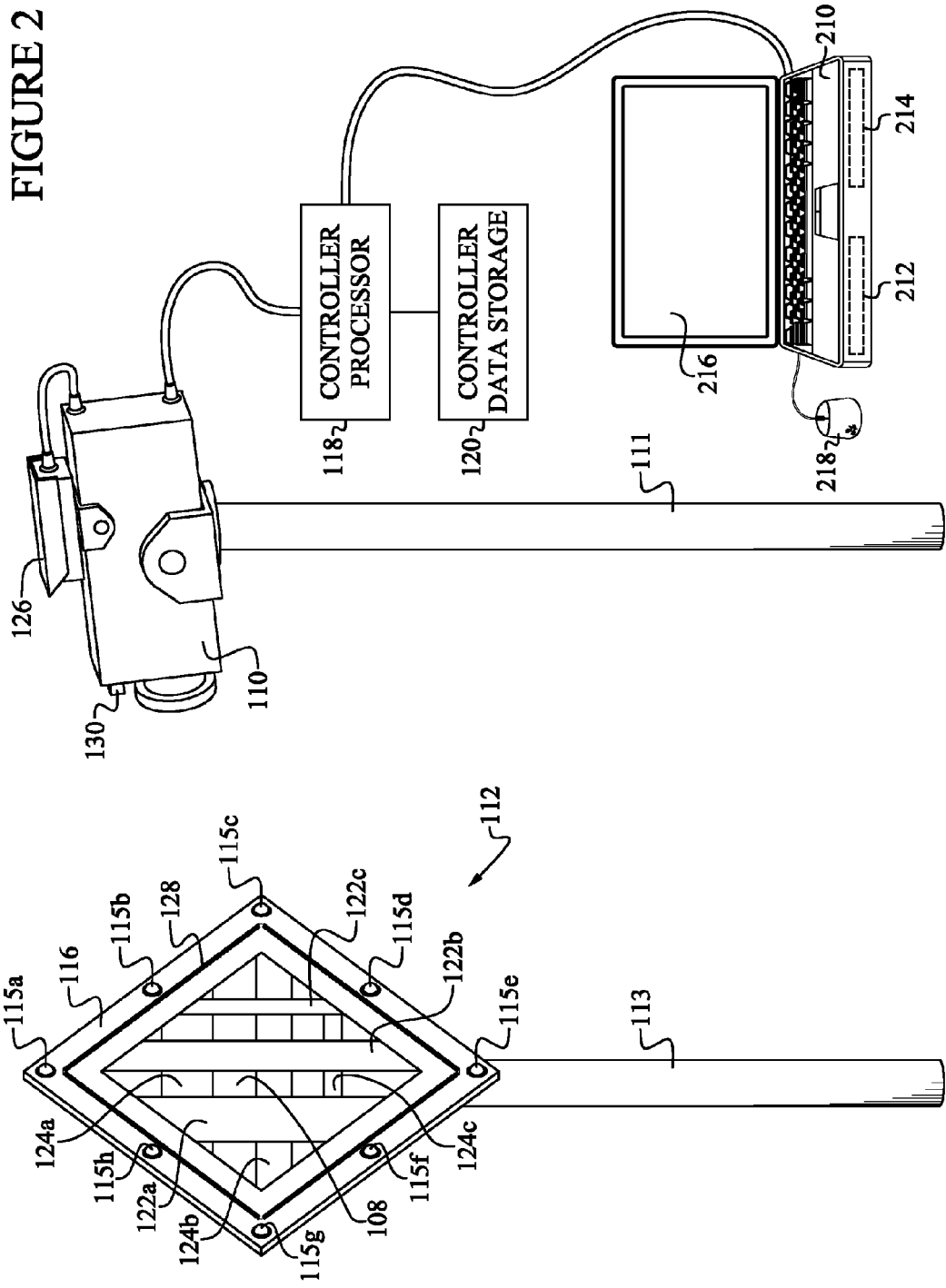

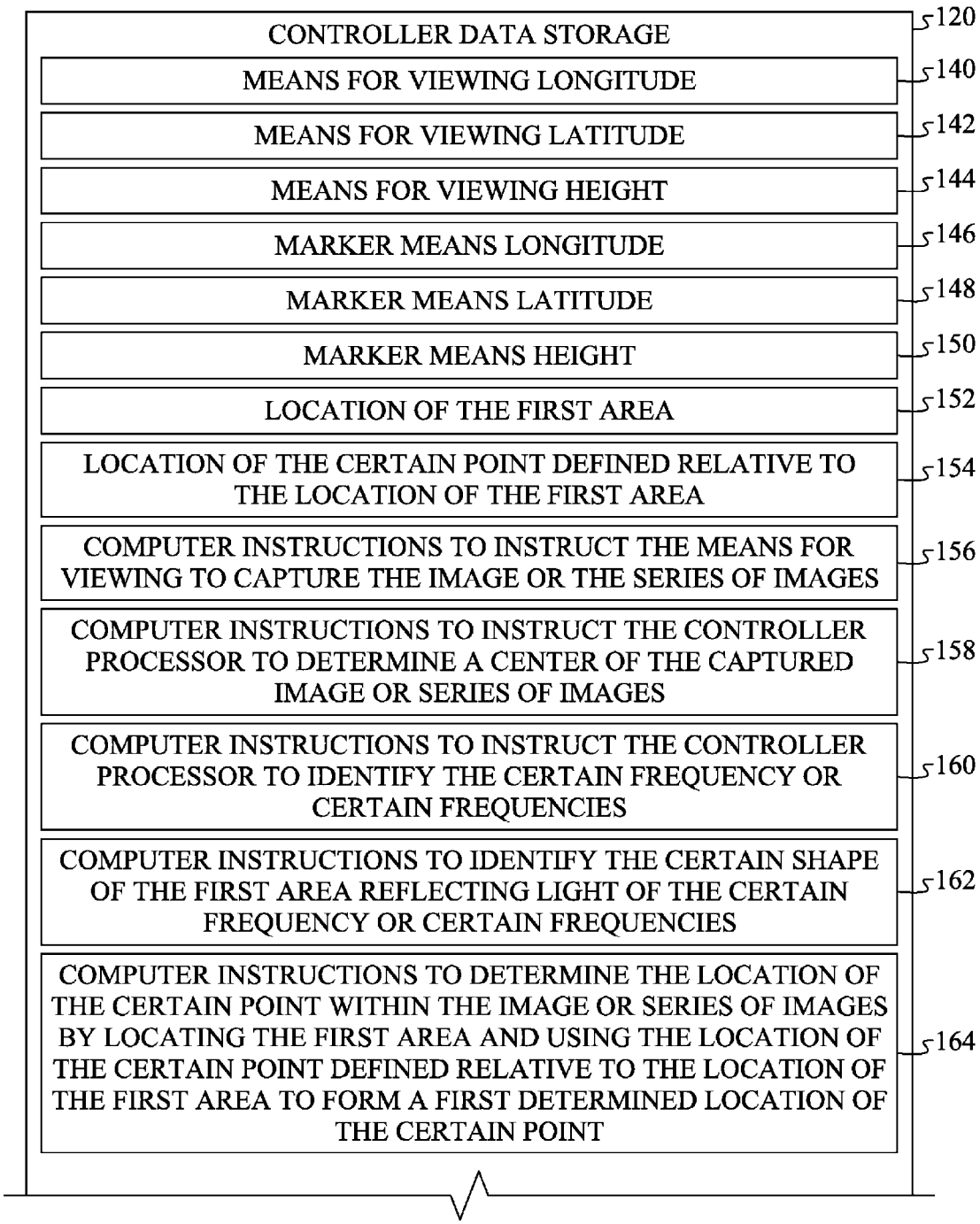

US 7,860,640 B1

MARKER MEANS FOR DETERMINING DIRECTION AND ZOOM OF A MEANS FOR VIEWING

CROSS REFERENCE TO RELATED APPLICATIONS

The present application is a continuation in part application claiming priority to co-pending U.S. patent application Ser. No. 11/360,958 filed on Feb. 24, 2006, the entirety of which is herein incorporated, and which in-turn claims priority to U.S. Provisional Patent Application Ser. No. 60/659,112 filed on Mar. 8, 2005 and U.S. Provisional Patent Application Ser. No. 60/659,184 filed on Mar. 8, 2005.

FIELD

The present embodiments generally relate to one or more systems for determining a direction and a magnification or zoom of a means for viewing.

BACKGROUND

A need exists for a system for accurately determining a direction and a magnification of a means for viewing.

A need exists for a system for determining direction and magnification of a means for viewing for use with a traffic control system to provide more efficient and safe traffic flow.

The present embodiments meet these needs.

BRIEF DESCRIPTION OF THE DRAWINGS

The detailed description will be better understood in conjunction with the accompanying drawings as follows:

FIG. 2 is a diagram showing the marker means and the means for viewing.

FIG. 3A is a diagram showing a controller data storage with computer instructions.

Figure 1:
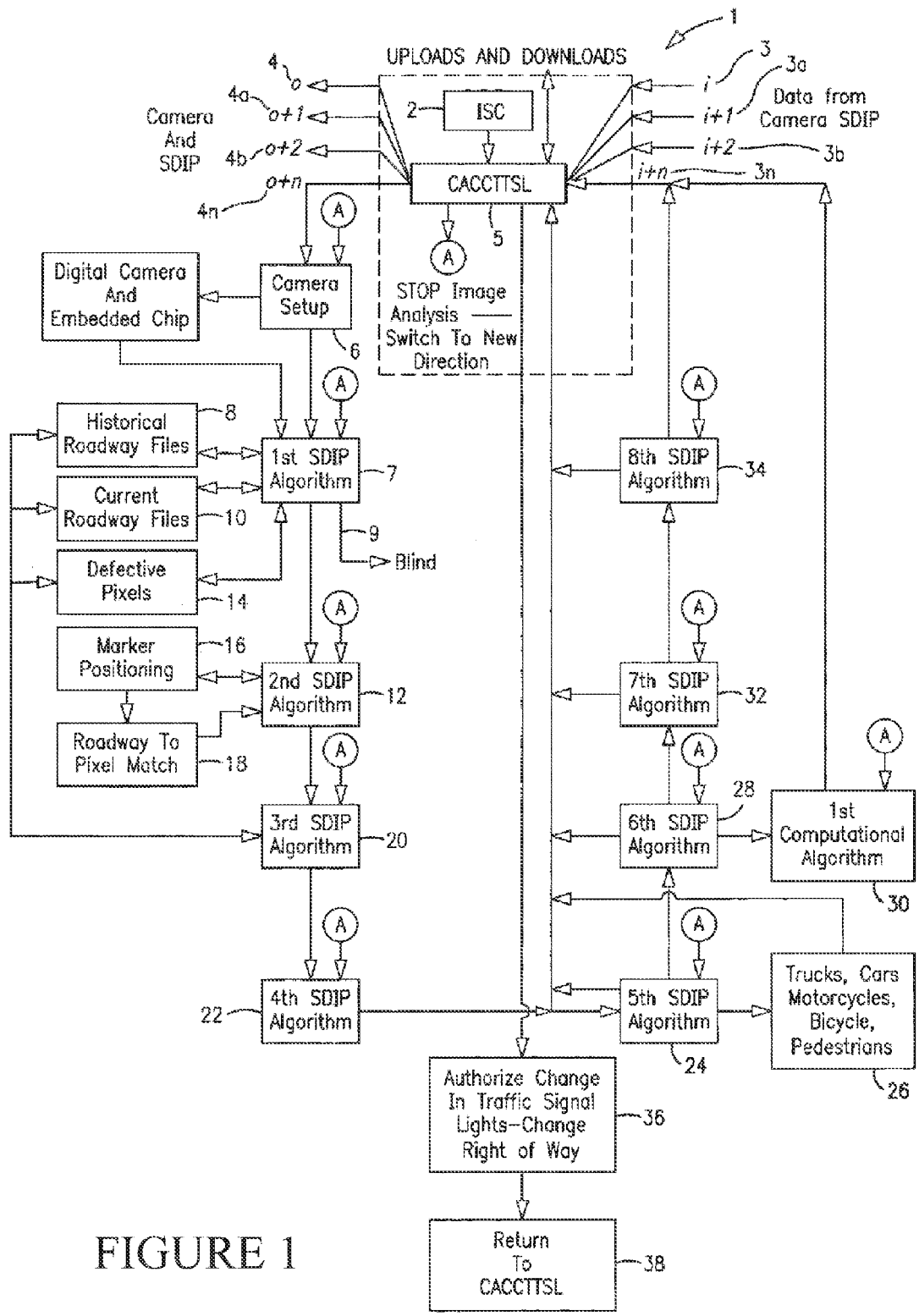
FIG. 1 is a logic diagram of a process for traffic control.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments generally relate to one or more systems to determine a direction and a magnification or a zoom of a means for viewing.

The means for viewing can be a digital camera, camcorder, video camera, radar transmitter/receiver, an infrared detector, or another optical detection device that can capture an image or can detect electromagnetic radiation such as light.

In one or more embodiments, a high resolution digital camera can be used that can have the ability to pan up to 360 degrees horizontally and 180 degrees vertically and zoom from about 1 to about 10 times with automatic focus.

Several such cameras are available that can be suitable for use in one or more embodiments of the system. For example, the camera can be the Cohu, Inc., Electronics Division 470 HTVL resolution color camera, which can be conveniently incorporated into the Cohu Model 3920 system having an i-dome enclosure, a high resolution CCTV camera, a fast positioner, and a sealed and pressurized dome enclosure.

Also available is Sony Corporations SSC-M383CE high-resolution black and white video camera. Other high-resolution digital video cameras are available with CCD chips, CMOS chips, embedded chips and devices, surveillance camera systems, camcorders, and optical systems.

One or more embodiments can be used in industries related to automatic warehousing logistics, biomedical and biomechanical areas, micro-manufacturing, space physics, traffic control, targeting, camera setup and calibration including camera direction, focus, and magnification.

In one or more embodiments, the means for viewing can be positioned at a specific location within three-dimensional space. The specific location can include a means for viewing longitude, a means for viewing latitude, and a means for viewing height, which can define the specific location of the means for viewing within three-dimensional space. The means for viewing can also have a field of view.

The means for viewing can capture an image or a series of images. Each image or series of images can have at least one pixel.

The means for viewing can have a marker means disposed within the field of view of the means for viewing. The marker means can be employed to act as a direction pointing reference for the means for viewing and as magnification verification. The marker means can be a flat geometrically shaped marker means and can have a highly reflective surface.

The highly reflective surface can be sized to be recognized by the means for viewing during the day or at night. For example, the marker means may be painted in a manner to glow in the dark, or the marker means can have an electrical glow wire visible by an infrared sensor in the means for viewing.

In one or more embodiments, the marker means can include lighting, embedded lights, a glowing design, hot wires, a microwave emitting device, an infrared emitting device, or a reflective surface, all of which can reflect and/or emit electromagnetic radiation at a certain frequency or certain frequencies to enable the means for viewing or a controller processor in communication with the means for viewing to locate and analyze the marker means.

In one or more embodiments, the marker means can be a conventional traffic control sign of sufficient size for the means for viewing or a controller processor in communication with the means for viewing to locate the marker means within an image or series of images. For example, in one or more embodiments the marker means can be from about 3 inches to about 24 inches on each side, however the marker means can be larger or smaller. The conventional traffic control sign marker means can have a highly reflective surface and a fixed and precise geometry for recognition by the means for viewing or a controller processor in communication with the means for viewing. The marker means can be installed or disposed on a signal pole, on a utility pole, on a dedicated pole, or on a building near an adjacent street or roadway.

In one or more embodiments, the marker means can be built with a swiveling section, collapsing section, retractable section, an open section, or can be hinged to allow the marker means to flex, bend, or move with the force of wind, to line up with the wind, or to otherwise resist destruction or deformation as a result of wind force. These above precautions can aid the marker means in resisting destruction during a hurricane or violent winds.

In embodiments, the means for viewing can easily detect the marker means. The marker means can be disposed alongside roadways for use in a traffic control system. The marker means can be disposed above vehicles traveling on the roadway and above other obstructions. The marker means can be positioned such that the means for viewing can observe both traffic and the marker means at the same time. The marker means can be disposed at a location suitable for avoiding graffiti and vandalism.

The length or distance between the marker means and means for viewing can be varied depending on the ability of the means for viewing to focus and sufficiently provide accurate images to the controller processor in communication with the means for viewing. For example, the length between the marker means and means for viewing can be from about 500 feet to about 1000 feet.

In one or more embodiments, the marker means can have a plurality of location areas. Each location area can have a set of predefined location area dimensions. For example, a plurality of location areas in the form of stripes can include stripes that can each have a predefined and different width, length, height, or combinations thereof.

Each location area can also include a location area color. The plurality of location areas can each have the same or different location area colors. In one or more embodiments, the different location area colors can be a set of contrasting colors, such as black and white. The location areas can include a highly reflective surface that can reflect light of a known, certain, or predefined frequency or frequencies.

Each location area can be spaced apart from other location areas. Each location area can be in the form of a particular shape, such as a stripe, a bar, a circle, a triangle, or another shape. In embodiments wherein the location areas are spaced apart, the space between each location area can include a color that can be different from the adjacent location area color or colors. In one or more embodiments, the space between each location area can be a color that contrasts with the color of the adjacent location areas, such as using black with white.

In embodiments wherein the location areas are spaced apart, the space between each location area can be of a dimension different from the adjacent location area dimension or dimensions. Each space between location areas can have a dimension that is different from other spaces between other location areas.

In one or more embodiments, the marker means can have a second plurality of location areas. Each location area of the second plurality of location areas can have a location area color, a different set of predefined location area dimensions from one another, and can be spaced apart from one another.

The second plurality of location areas can be disposed at an angle to the first plurality of location areas and can intersect the first plurality of location areas.

The marker means can include additional pluralities of location areas, which can be formed substantially similar to the first and second location areas. Each additional plurality of location areas can be disposed at an angle from other location areas and can intersect the other location areas. The various pluralities of location areas can have location area colors that can be the same color or a different color.

In one or more embodiments, pluralities of location areas disposed vertically can be used to determine a left to right or a latitude and longitude position of the marker means. Pluralities of location areas disposed horizontally can be used to determine a height or altitude position of the marker means.

The location areas can comprise a paint, a sticker, metal, plastic, wood, a sign, or various other materials of construction.

The marker means can have a known, predefined, or certain point. The certain point can be positioned at a specific location within three-dimensional space. The specific location of the certain point can include a marker means longitude, a marker means latitude, and a marker means height, which can define the specific location of the certain point within three-dimensional space.

The marker means can have a first area. The first area and the plurality of location areas can each have an electromagnetic radiation-emitting device for emitting electromagnetic radiation at a certain frequency or at certain frequencies. The electromagnetic radiation-emitting device can be selected from the group consisting of: an incandescent bulb, an light emitting diode "LED", a florescent bulb, a neon bulb, a halogen bulb, a laser, an LCD screen, or combinations thereof.

The first area can be of a certain shape with certain dimensions, such as an octagon, a square, a circle, a triangle, a bar, a stripe, or another shape. In one or more embodiments, the certain shape can be disposed about a border or an edge of the marker means. The certain shape can be at least one color, and the first area can reflect light at least one frequency.

The system can include a controller processor in communication with a controller data storage. The controller processor and controller data storage can be resident on a computer. The controller processor can be in communication with the means for viewing. The controller processor can receive the image or series of images from the means for viewing, or data associated with the image or series of images from the means for viewing.

The controller data storage can store the specific location of the means for viewing as a data file, such as the means for viewing longitude, the means for viewing latitude, the means for viewing height, or combinations thereof.

The controller data storage can store the specific location of the certain point as a data file, such as the marker means longitude, the marker means latitude, the marker means height, a location of the first area, a location of the certain point that can be defined relative to the location of the first area, a location of the certain point that can be defined relative to each of the location areas of the plurality of location areas, or combinations thereof.

A design of the marker means can be stored in the data storage. The design stored in the controller data storage can include dimensions of the marker means, such as a width, a length, and a height. The controller data storage can include the certain shape, the dimensions, the certain frequency, and the certain frequencies of the first area as a data file.

In embodiments, the controller data storage can have stored data files. The controller data storage can include the shape, the different predefined dimensions, the certain frequency, and the certain frequencies of each of the location areas of the plurality of location areas. The stored data file can have a location of each location area of the plurality of location areas on the marker means.

In one or more embodiments, the controller data storage can have computer instructions to instruct the means for viewing to capture the image or the series of images. The controller data storage can have computer instructions to instruct the controller processor to identify the certain frequency or certain frequencies of the first area or the location areas.

In embodiments, the controller data storage can have computer instructions to instruct the controller processor to identify the certain shape of the first area emitting or reflecting the electromagnetic radiation of the certain frequency or certain frequencies.

The controller processor can identify the various shapes, colors, dimensions, and frequencies by comparing the image or series of images, or data associated with the image or series of images, to the various stored shapes, colors, dimensions, and frequencies within the data storage. The comparison and identification by the controller processor can be performed on a pixel-by-pixel basis.

In embodiments, the controller data storage can have computer instructions to determine the location of the certain point depicted within the image or series of images by locating the certain shape.

For example, a predefined location of the certain point can be saved within the controller data storage and can be defined relative to the location of the certain shape. The controller processor can use the identified location of the certain shape within the image or series of images and the predefined location of the certain point to determine the location of the depicted certain point within the image or series of images, which forms a first determined location of the certain point.

The controller data storage can have computer instructions to determine the direction of the means for viewing by using the means for viewing longitude, the means for viewing latitude, the means for viewing height, a determined location of the certain point or an average determined location of the certain point, and the magnification of the lens of the means for viewing.

The direction of the means for viewing can include the direction that the lens of the means for viewing is pointed, the direction that the aperture of the means for viewing is pointed, and the angle of the means for viewing with respect to a fixed plane or fixed planes. The fixed planes can include the surface of the earth proximate the means for viewing, the surface of a roadway, a vertical plane, or a horizontal plane.

The controller data storage can have computer instructions to instruct the controller processor to identify location areas depicted within the image or series of images by identifying location area colors, certain frequency or frequencies of electromagnetic radiation emitted or reflected by location areas, or combinations thereof.

The controller data storage can have computer instruction to instruct the controller processor to determine a location of each location area of the plurality of location areas within the image or series of images by using the stored data file.

The controller processor can identify the location areas by comparing the image or series of images, or data associated with the image or series of images, to the stored data file associated with the location areas. The comparison, identification, and determinations by the controller processor can be performed on a pixel-by-pixel basis.

For example, the pixels associated with a particular location area can be analyzed on a pixel-by-pixel basis to confirm that each pixel represents light of the certain frequency or certain frequencies or the location area color, and that the pixels that represent the light of the certain frequency, certain frequencies, or location area color have the predefined area dimension of the location area stored in the controller data storage.

In embodiments, the controller data storage can have computer instructions to determine the certain point location depicted within the image or series of images to form a second determined location of the certain point. The second determined location of the certain point can be defined relative to the location of each location area of the plurality of location areas.

For example, a predefined location of the certain point can be saved within the controller data storage and can be defined relative to the location of each location area. The controller processor can use the identified location of each location area within the image or series of images and the predefined location of the certain point to determine the location of the depicted certain point within the image or series of images, which forms a second determined location of the certain point.

The controller data storage can have computer instructions to instruct the controller processor to determine a pixel spacing within the image or series of images. The pixel spacing can be defined relative to dimensions of each location area of the plurality of location areas to form determined pixel spacing.

The accuracy of locating the marker means within the field of view of the means for viewing can be determined by the number of pixels that fall within the location areas of the marker means.

For example, if the means for viewing captures an image comprising a particular location area of known predefined dimensions and the number of pixels that are disposed along the captured image of the known predefined dimensions is 20 pixels, a computational analysis by the controller processor can be performed to determine the pixel spacing. The controller processor can thereby determine the distance in three-dimension space that the pixel spacing represents. This can be used to determine the magnification or zoom of the means for viewing.

Variations in spacing distances can be incorporated between the location areas. Each location area can have a different predefined dimension. By using different predefined dimensions for each location area, the controller processor can determine exactly which location area the controller processor is analyzing in the image or series of images comprising the location areas.

For example, if the marker means comprises three location areas with a location area disposed on a right of the marker means that is 10 inches wide, a location area disposed in a middle of the marker means that is 20 inches wide, and a location area disposed on a left of the marker means that is 30 inches wide, the controller processor can determine that the smaller location area in the captured image is the location area on the right, the larger one is the location area on the left, and the remaining location area is the one on in the middle. By using proper design of the dimensions of the location areas or the spacings located between the locations areas, the precise location of the marker means within the field of view can be calculated to within 1% of the pixel spacing on the marker means.

As an example, a marker means design with a pixel spacing of 3 inches can have an accuracy of 1.5 inches in each perpendicular direction and can require a location area measuring 6 inches by 6 inches on the marker means for the accuracy of 1.5 inches.

Another example can have an accuracy of 0.3 inches, which can require a location area of 15 inches by 15 inches. Another example can have an accuracy of 0.03 inches, which can require a location area of 150 inches by 150 inches. Larger pixel spacings can require larger marker means to achieve the same or similar accuracies.

Deviations in pixel spacing of the means for viewing can result from a manufacturing process of the means for viewing. These deviations can be incorporated or used in calculations to locate the marker means within the field of view to achieve higher accuracy. This can be a form of calibration of the accuracy of the means for viewing.

Deviations in the lens of the means for viewing can result from a manufacturing process of the lens. These deviations can be used in calculations to locate the marker means within the field of view to achieve higher accuracy. This can be used to calibrate the accuracy of the means for viewing.

The controller data storage can have computer instructions to determine the magnification of the means for viewing by using the determined pixel spacing.

In one or more embodiments, the controller data storage can have a second stored data file comprising a position of each location area of the second plurality of location areas, the marker means, and the dimensions of each location area of the second plurality of location areas. The controller data storage can have computer instructions to instruct the controller processor to identify each location area of the second plurality of location areas within the image or series of images by identifying the area color, a certain frequency, or certain frequencies of each location area of the second plurality of location areas.

The controller data storage can have computer instructions to determine a position of each of the location areas of the second plurality of location areas within the image or series of images by using the second stored data file.

The controller data storage can have computer instructions to determine the certain point location within the image or series of images to form a third determined location of the certain point. The third determined location of the certain point can be defined relative to the position of each location area of the second plurality of location areas. One or more of the determined locations of the certain point can be averaged to form an average determined location of the certain point.

Determined locations or average determined locations of the certain point can be used to relate the known specific location of the certain point, such as a longitude, latitude, and height of the marker means, to a point within a captured image or series of images that can be a depiction of the certain point.

Determined pixel spacings, or average determined pixel spacings, can be used to determine magnification, which can be used in conjunction with the determined locations or average determined locations of the certain point, thus allowing computational determination of the center of the captured image or series of images, and thereby to determine the direction that the means for viewing is pointed.

By knowing the specific location in three dimensional space of the means for viewing, the specific location in three dimensional space of the certain point, the depicted location of the certain point within the image or series of images, and the determined pixel spacing, a center of the image can be determined and a specific location in three dimensional space associated with the center of the image can be determined.

The controller data storage can have computer instructions to determine a second pixel spacing within the image or series of images to form second determined pixel spacing. The second pixel spacing can be defined relative to a set of pre-defined dimensions of each location area of the second plurality of location areas. The second pixel spacing can be determined in the same way as the first pixel spacing except by using the second location areas. Various determined pixel spacings can be averaged to form an average determined pixel spacing.

The controller data storage can have computer instructions to determine the magnification of the means for viewing by using the second determined pixel spacing or an average determined pixel spacing.

An embodiment of the system can have a lighting device for directing light onto the marker means. The marker means first area and location areas can reflect at least part of the light directed to it by the lighting device at the certain frequency or certain frequencies.

Also, the size of the marker means, the design of the marker means, and the distance of the marker means from the means for viewing can be input as input data into the data storage, allowing an SDIP algorithm to search in the area of the marker means, to locate the marker means and to determine the direction of the means for viewing on the known position of the marker means.

At an optical magnifying power necessary to be able to calculate locations and speeds for vehicles as far away from the means for viewing as 2000 feet, each pixel may represent a point from about 0.5 inches to about 3 inches from the next closest point. For example, with a 3-inch spacing a marker means can be at least about 12 inches by about 96 inches.

One or more embodiments can include a marker means direction and/or magnification fail algorithm stored in the controller data storage. The means for viewing direction and/or magnification fail algorithm can include computer instructions to determine that the means for viewing did not locate the marker means. For example, if the controller processor does not locate or recognize the certain frequency or certain frequencies, the controller processor can determine that the marker means was not located within the image or series of images.

The means for viewing direction and/or magnification fail algorithm can include computer instructions to determine that the means for viewing located the marker means at a location other than at the first specific location, which can indicate a failure of the means for viewing.

In one or more embodiments wherein the marker means is in communication with a traffic control apparatus for traffic control, the means for viewing direction and/or magnification fail algorithm can include computer instructions to instruct the controller processor to initiate a fail safe intersectional area protocol and to initiate an alarm for repair of the traffic control apparatus, the means for viewing, or the marker means. The fail-safe intersectional area protocol can include ceasing functions of the means for viewing until after the repair has occurred.

One or more embodiments of the system can include an installer supervisory control computer, which can comprise an installer processor and an installer data storage. The installer supervisory control computer can be in communication with the controller processor, the controller data storage, the means for viewing, or combinations thereof.

The installer supervisory control computer can receive an image or series of images from the means for viewing. For example, the controller data storage can have computer instructions to instruct the controller processor to send an image or series of images from the means for viewing to the installer supervisory control computer.

The received at least one image can comprise a depiction of at least one marker means and can be viewable on a display of the installer supervisory control computer. The user can use an input device, such as a computer mouse, to identify pixels associated with each marker means or with a location of each marker means, such as by clicking on portions of the displayed image with the mouse.

The user can also input other location data associated with the marker means into the installer supervisory control computer, such as a marker means longitude, a marker means latitude, and a marker means height. The inputted location data can be associated with the identified pixels.

The installer data storage can have computer instruction to instruct the installer processor to send the inputted location data and the image or series of images with the identified pixels to the controller processor, the controller data storage, the means for viewing, or combinations thereof.

The controller processor can then use the inputted location data and the image or series of images with the identified pixels to determine which portions of an image or series of images to analyze to locate the marker means within the image or series of images.

In the operation of one or more embodiments, the means for viewing can capture an image or a series of images and can transmit the captured image or series of images to the controller data storage. The controller processor can analyze the captured image or series of images on a pixel-by-pixel basis to determine the presence of at least one pixel representing the certain frequency or certain frequencies emitted or reflected by the first area.

The controller processor can continue to analyze the captured image or series of images on a pixel-by-pixel basis to determine that pixels representing the certain frequency or certain frequencies emitted or reflected by the first area are in the form of the certain shape; thereby verifying the presence and position of a depiction of the marker means and the first area within the captured image or series of images.

The controller processor can analyze the captured image or series of images to determine a position of at least one pixel depicting the certain point or approximately depicting the certain point using the verified position of the depiction of the first area, the magnification of the means for viewing, and a data file defining the specific location of the certain point relative to the first area. The controller processor can associate a known longitude, latitude, and height of the specific location of the certain point with the at least one pixel depicting the certain point or approximately depicting the certain point.

The controller processor can analyze the captured image or series of images to determine a center of the image or series of images by determining which pixel or pixels are disposed in the center of the image or series of images. The center of the image or series of images can correspond to a direction that the lens of the means for viewing is pointed and to a specific location in three-dimensional space that the means for viewing is pointed.

The controller processor can determine a pixel distance from the at least one pixel depicting the certain point or approximately depicting the certain point and at least one pixel disposed in the center of the image or series of images. The controller processor can use the magnification of the means for viewing, the specific location of the certain point, the center of the image or series of images, and the determined pixel distance, to determine the specific location in three dimensional space that corresponds to the center of the image or series of images; which can include a latitude, a longitude, and a height. Using the specific location of the means for viewing, the specific location of the marker means, and the specific location of the center of the image or series of images, the controller processor can determine the direction that the means for viewing is pointing.

FIG. 1 depicts a Logic Diagram for a Traffic Control Signal Computer Program usable with the marker means. In addition to normal operating system software, such as input/output, communication and calculation features, the central processing unit or controller processor employed in the present invention can include a program. The program can be comprised of several sub-programs or algorithms for specific functions as described hereinafter and several SDIP Algorithms for analyzing less than entire image or pixel-by-pixel processing.

As shown in FIG. 1, the CACCTTSL logic diagram provides a central processing unit or CPU 1 that allows an input signal from an outside source, such as an installer supervisory control (ISC) computer 2 from an initial installers computer, a centralized traffic control computer, or from a network of intersections overall control computer. Also, inputs i, i+1, i+2, i+n, which are 3, 3a, 3b, 3n, respectively, from the SDIP algorithms can be installed into the CACCTTSL program 5, while outputs o, o+1, o+2, o+n, which are 4, 4a, 4b, 4n, respectively, can be sent with instructions for a change in position of the means for viewing or a request for data from various SDIP algorithms.

The data or information can be received by the CPU 1 from the viewing means and can be input to the main evaluation and analysis program of SDIP algorithms. The CACCTTSL program 5 can initiate the analysis and evaluation by giving instructions to the means for viewing to set up module 6, which can control the means for viewing position and can provide for pan, tilt or zoom movement of the means for viewing to allow for better viewing of a particular zone or area of interest in or around an intersection.

The First SDIP Algorithm 7 can establish from the data provided by the means for viewing or camera whether some atmospheric condition has blinded the observation by comparison with a library of roadway files 8 maintained within the controller data storage. The roadway files 8 can be maintained in the controller data storage to represent empty road pixel values for each point of each lane of each roadway filed according to time of day, day of year, year and weather conditions, such as dry, wet, flooded, iced, snow-covered or the like.

Where no vehicle is detected, a second file can be set up for the same time, day, year and weather condition as a variant of the roadway files 8. This variant of the roadway files can be stored in current roadway files 10. If the current roadway file 10 data is identical, or within limits, to the same roadway condition already stored in the roadway files 8, the current roadway file 10 can be discarded.

In the event that a sample of the pixels in the data show a "sameness", that is the pixels are essentially the same, then a wider sampling of pixels can be triggered. In the event that this "sameness" of the pixels can be confirmed, then the conclusion is reached that the means for viewing is blind and a blind output signal 9 can be sent to the traffic control signal means. The traffic control means can then revert to a standard protocol for granting right of way or the green light to a roadway in the intersection and the CACCTTSL program logic can revert to another iteration of pixel sampling until a non-blind condition is detected.

When the First SDIP Algorithm 7 encounters a sampling of pixels that are different, and the pixels do not represent a "sameness" of light condition, then a comparison of roadway files 10 can be conducted and differences can be sent to the Second SDIP Algorithm 12. The library of defective pixels 14 can be consulted via a subroutine to determine whether a particular pixel has become non-responsive to light in order to maintain a list of defective pixels so that these can be excluded during simplified image processing.

The Second SDIP Algorithm 12 can establish or calibrate accurately the position of the means for viewing. The Second SDIP Algorithm 12 can determine the means for viewing position in order to avoid errors from movement caused by wind or vibration as a result of traffic or nearby activity. Even though the means for viewing is not necessarily moved between image or partial image capture, for instance, between images captured which are spaced 1 second apart, movement of the means for viewing can be taken into account during image processing. Further, when the means for viewing is repositioned to a different roadway, calibration can be conducted.

As indicated previously, the means for viewing position can be established by reference to a distinct marker means installed at a known location in or around the intersection, as initially input during installation setup, initializing or maintenance. The size, distance, location and design allow Second SDIP Algorithm 12 to search for a marker means and identify it by using a marker means positioning subroutine 16. When the Second SDIP Algorithm 12 detects a match with a particular marker from the marker positioning subroutine 16, then the means for viewing direction can be known and the roadway can be identified. These pixels in the known roadway can then be stored in a roadway-to-pixel match file 18. The matching or identification data can be provided to allow the Third SDIP Algorithm 20 to select the appropriate clear or empty roadway condition from roadway files 8 or current roadway files 10. The matching or identification data can be compared to the selected pixel data from the Fourth SDIP Algorithm 22, which can have the objective of finding a vehicle on the roadway.

As the installed data can establish the position of each lane from the intersection to as much as 2000 feet from the intersection, the Fourth SDIP Algorithm 22 can search the pixels along the lanes in the same direction from the intersection, selecting pixels which are spaced apart sufficiently to nevertheless detect motorcycles, small cars and the like. The sampled pixels, which can be less than the total number of pixels that form the captured images, can be compared to the empty roadway files 10. If there is not a match, the permanent files in the historical roadway files 8 can be searched.

Again if there is not a match, the atypical pixels can be selected as focal points for the search for vehicles or other objects in the lanes of interest. In addition, the CACCTTSL program 5 can be notified of these focal point pixels as part of an early notice and continual update feature of the procedure used by the system. The atypical pixel locations can be provided to the Fifth SDIP Algorithm 24 to start a search for one or more vehicles. On a pixel by pixel search, the form of a vehicle can be filled in and compared to files of motor vehicles, such as trucks, cars, motorcycles, bicycles and pedestrians maintained in vehicle files 26. The size and shape can be compared to the memory files for a match or close approximation.

To match the size or shape of, for example, a vehicle, the image processing can take into account the height of the means for viewing, the angle at which viewing occurs and the distance away from the means for viewing because these and other factors can influence the target vehicle's aspect and thus alter the shape with which a match can be made. In other words some compensation can be made for the comparison to the memory file. If the target vehicle (pixels) is too long, it can be considered by the Fifth SDIP Algorithm to be a line of vehicles travelling at the same speed. The CACCTTSL program 5 can be notified about the results as part of the early notification and continual update feature of the overall system procedure.

The information or data can be provided to the Sixth SDIP Algorithm 28 which can calculate the distance of the vehicle(s) from the intersection using simple triangulation calculations speed on the height of the means for viewing above the roadway, the direction in which the means for viewing is pointing, the elevation of the lanes as a function of distance from the intersection and using the lowest point of the vehicle(s) as one corner of the triangle. Various points on the vehicle(s) can be used for the calculation, e.g., the front bumper, front tire, the shadow on the ground, or the headlight at night, since the variation of the reference point on the vehicle introduces only very small error into the calculations. The CACCTTSL program 5 can be notified of the distance as part of the early notification and continual update feature of the overall system procedure.

First computational algorithm 30 can use consecutive results from the Sixth SDIP Algorithm 28 at a spacing of about 1 second for the calculation of the speed of the vehicle(s) and of the estimated time at which the intersection can be reached. The CACCTTSL program 5 can be notified of the results. The Seventh SDIP Algorithm 32 can gather images of all lanes, including turn lanes, at the intersection according to instructions from the CACCTTSL program 5 and can instruct how far to search along each lane. Information from the Fifth SDIP Algorithm 24 can be used to determine the images based on atypical pixels provided by the Seventh SDIP Algorithm 32.

After the vehicle(s) have been located, identified and the speed has been determined, the Eighth SDIP Algorithm 34 can be used to calculate the expected new location of the vehicle(s) and can look for the vehicles(s) in data supplied from the means for viewing. Once verified, an output of the new distance, speed, and expected time of arrival at the intersection can be notified to the CACCTTSL program 5. With this new data, the CACCTTSL program 5 can then run its logical protocol to determine whether to maintain the right of way currently shown on the traffic control signal light or when to stage the light for granting the right of way to another lane or to a turn lane.

The CACCTTSL program 5 can determine when to stop analyzing a specific direction or lane of traffic on a roadway or what data are required. The CACCTTSL program 5 can use the inputs to the various algorithms and to the means for viewing via the stop/change input labeled "A" in FIG. 1. The CCACCTTSL program 5 can then instruct the imaging and evaluation and analysis system to begin in a different direction or of the intersection itself.

As indicated, the overall logic of the traffic control program can be handled by the CACCTTSL program 5 based on SDIP evaluation and analysis. The logical proposition can be hierarchical in nature and can consider five cases discussed below.

CASE 1: Right of Way Lanes are Empty. In this case SDIP algorithms have determined that the lanes of the roadway having the green light or right of way are empty. Thus, the right of way can be changed to those lanes having vehicles waiting or approaching within about 20 seconds to 30 seconds.

CASE 2: Right of Way Lanes Have Traffic Which is Not Moving. In this case, the SDIP algorithms have determined that lanes with the right of way have vehicles in them, but the traffic is not moving. The program can check to determine that vehicle(s) in the right of way lane have cleared the intersection before considering whether to return the right of way. Also, the program can determine whether the stopped vehicles are being by-passed; thus, allowing continuation of the right of way. Otherwise, the right of way can be changed to another lane of the roadway.

CASE 3: Right of Way Lanes are Full and Moving. In this case, the right of way can be maintained until priority of traffic guidelines is exceeded. Before the right of way is changed, a calculation can be done to determine the cost of kinetic energy, as skilled persons in the art would know how to accomplish, and compare to the guidelines for priority.

CASE 4: Right of Way Lanes Have Traffic but Have a Gap. In this case, the program can note that a space between approaching vehicles, a "gap", is approaching the intersection. A calculation of the kinetic energy to be lost if the gap is not used to change the right of way can be compared to guidelines to determine if the cost is too great. If so, a change in right of way can be indicated. Otherwise, the change can be delayed until priority times are exceeded.

CASE 5: Right of Way Lanes Have Traffic with an End. In this case, the SDIP algorithms have detected that a line of traffic with the right of way has an end. Before the end arrives at the intersection, if priority time is exceeded, the CACCTTSL program 5 can change the right of way. If on the other hand the end arrives at the intersection and the priority time is not exceeded, the program can change the right of way after the end of the traffic line has passed the intersection.

Based on the data provided by the means for viewing, the evaluation and analysis of the SDIP algorithms and the logical resolution of the hierarchical cases of the CACCTTSL program 5, a determination to change the right of way can be reached and a signal can be sent to authorize a change in the traffic signal module 36. The appropriate instruction can be sent to a traffic control signal unit.

The authorized change in the traffic signal module 36 can notify the return to CACCTTSL module 38 and a signal can be given to the CACCTTSL program 5 that the change in right of way has been completed. The CACCTTSL program 5 can stop image processing in the SDIP algorithms and can instruct the means for viewing to reposition, and the process can begin again.

Although the integrated central processing unit 1 can contain the CACCTTSL program 5 and can handle supervisory control and active image processing and initiation of changes in the timing of traffic control signal lights, an operator using the installer supervisory control computer 2 can override the CACCTTSL program 5. This can be done by using either direct plug-in hardwire connection at the intersection, hardwire or wireless connection to a central traffic dispatch center or wireless or hard wire plug-in connection from a laptop computer.

Such intervention can allow modification of traffic flow or control guidelines, i.e., the normal or default traffic signal timing protocol, download information to the various memory files, upload traffic information or operating data for archival purposes, reset the system after blind condition or repair and maintenance or troubleshooting the system. The installer supervisory control computer 2 can allow the ability to control the means for viewing and to input, such as by point and click means, information which may be required by the SDIP algorithms.

For example, the locations and design of each marker means along the roadways, identification of each lane in the roadway from the intersection and for some distance out, such as up to or beyond 2000 feet, each turn lane, parking space locations, major obstructions, such as buildings, trees, utility poles, sign posts, wires and the like which exist in the field of the means for viewing.

In embodiments, the use of separate computational devices for each algorithm or subroutine can be simultaneously parallel processed of all simplified digital image processing. Computations can be carried out to allow traffic control in real time.

In embodiments, multiple means for viewing can be used that are the same or different types that can take into account different weather or time factors, such as daylight or dark. In a similar manner, multiple means for viewing can be employed to negate the effect of hills, curves, dips or other roadway obstructions.

Likewise, any suitable or conventional camera technology may be employed, such as the use of black and white, color, or grayscale video technology, or combinations thereof.

The system can be initially installed at an intersection on a new roadway or can be retrofitted to an existing intersection with relative ease and without disrupting the existing roadway bed or traffic flow. The system can be used continually or in intermittent fashion when the CACCTTSL program determines that waiting and slowing and stopping can be reduced or avoided when unnecessary.

In embodiments, two or more intersections can be linked together to provide smooth and efficient traffic flow. Likewise, the algorithms can be modified to be controlled from a central traffic dispatch center or station using the results uploaded from several intersections to control traffic.

FIG. 2 depicts a diagram showing the marker means 112 and the means for viewing 110.

The marker means 112 can be disposed on a pole 113. A first area 116 can be disposed about a border of the marker means 112. The first area 116 can be of a certain color for reflecting light of a certain frequency or certain frequencies.

In one or more embodiments, the first area 116 can include lights 115*a*-115*h* or another electromagnetic radiation emitting device for emitting light of a certain frequency or certain frequencies. The marker means 112 can include an electrical glow wire 128.

A first plurality of location areas 122*a*-122*c* can be disposed on the marker means 112 and can extend vertically. Each location area of the first plurality of location areas can have a different predefined dimension, here shown as a different width. A second plurality of location areas 124*a*-124*c* can be disposed on the marker means 112 and can extend horizontally. Each location area of the second plurality of location areas can have a different predefined dimension, here shown as a different width.

A certain point 108 can be disposed on the marker means 112. The certain point 108 can be any point on the marker means 112.

The means for viewing 110 and a lighting device 126 can both be disposed on a pole 111. The means for viewing 110 can include an infrared sensor 130 for sensing infrared signals emitted by the electrical glow wire 128.

The means for viewing 110 can be in communication with a controller processor 118 which can be in communication with controller data storage 120.

An installer supervisory control computer 210 can be in communication with the controller processor 118. The installer supervisory control computer 210 can include an installer processor 212, an installer data storage 214, a display 216, and an input device 218.

Figure 3B:
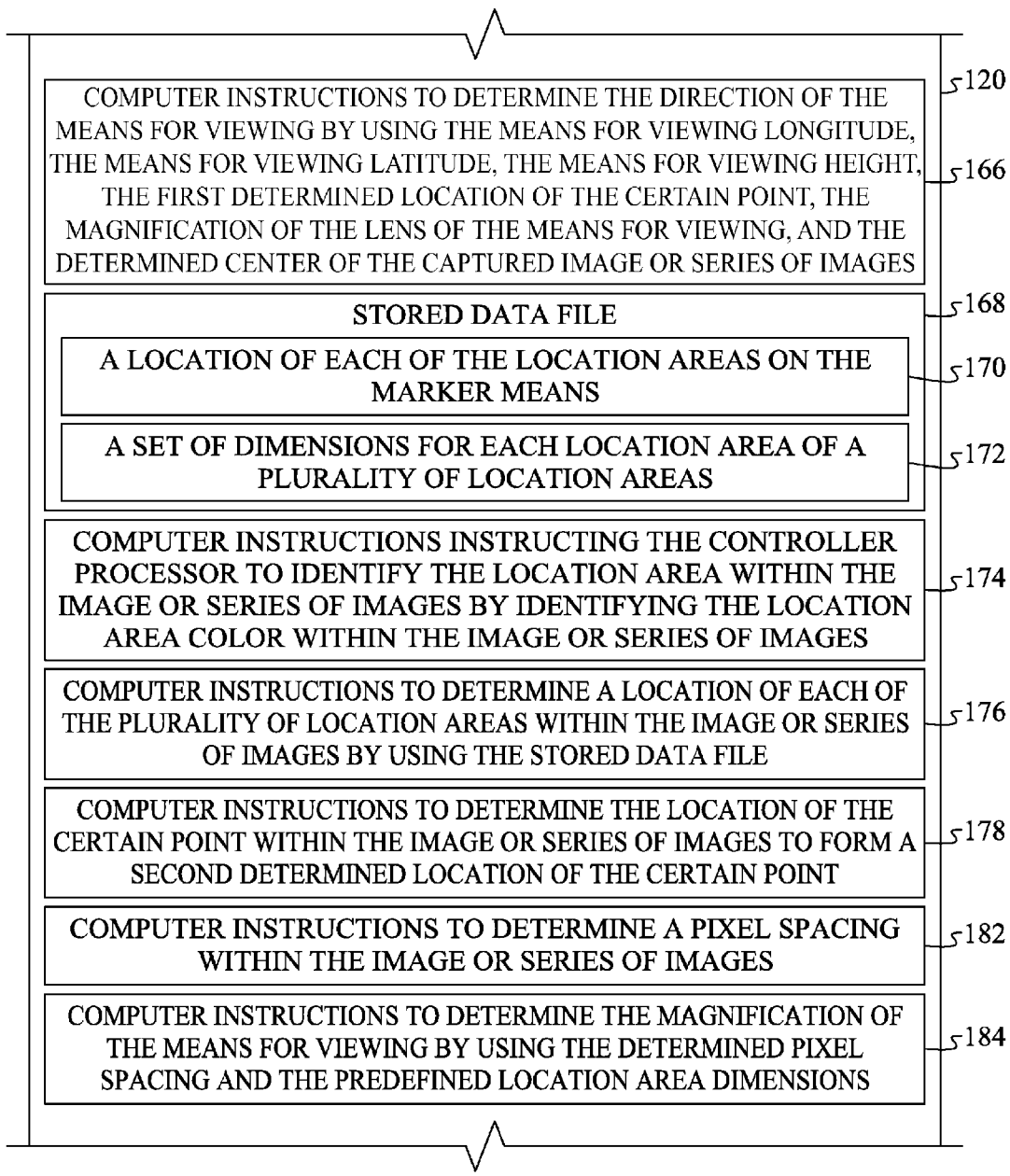
FIG. 3B is a continuation of the diagram shown in FIG. 3A.
Figure 3C:
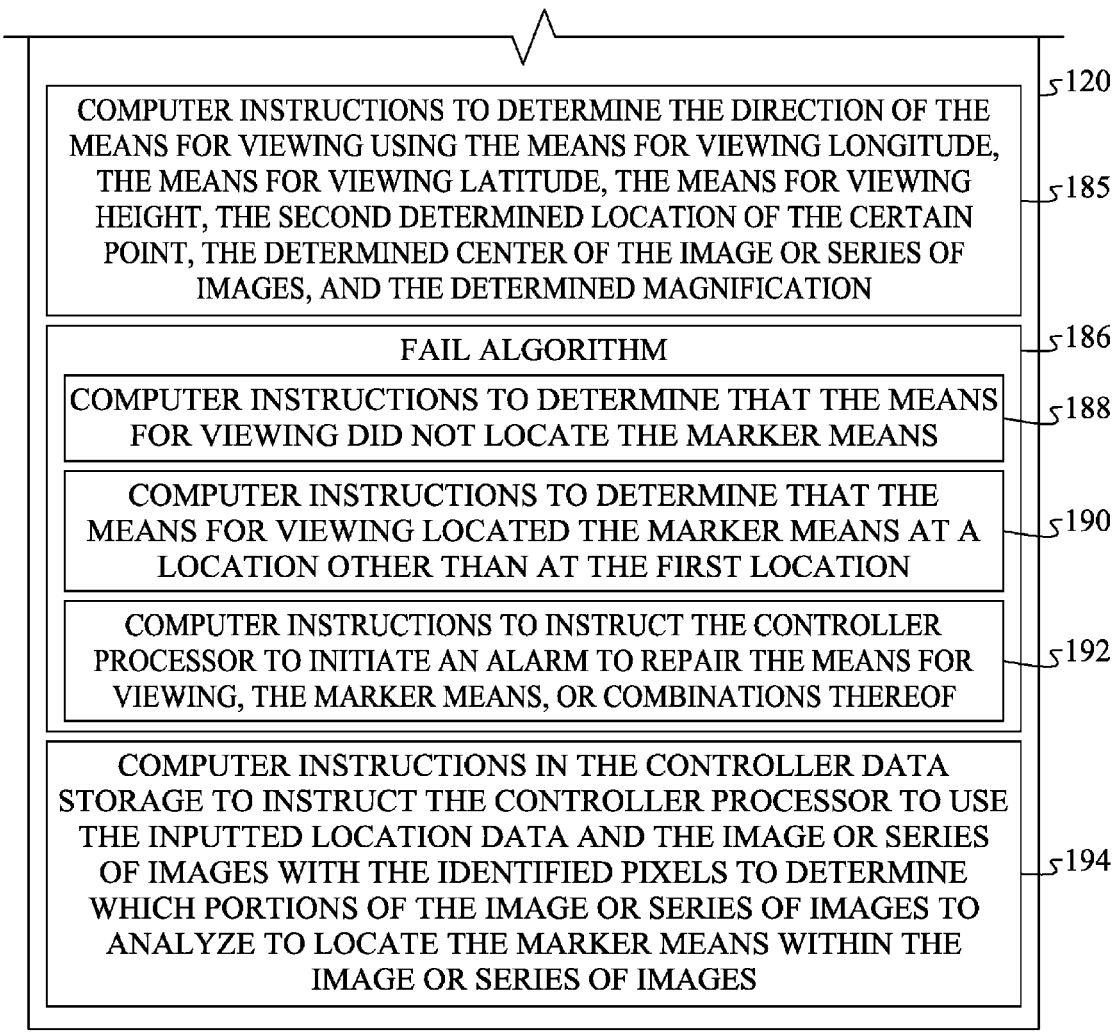
FIG. 3C is a continuation of the diagram shown in FIG. 3B.

FIGS. 3A-3C depict diagrams showing the controller data storage 120 with various computer instructions.

FIG. 3A shows the controller data storage 120, which can include the means for viewing longitude 140, means for viewing latitude 142, and means for viewing height 144; the marker means longitude 146, marker means latitude 148, and marker means height 150; a location of the first area 152; and a location of the certain point defined relative to the location of the first area 154. The various longitudes, latitudes, heights, and locations can be stored as data file in the controller data storage.

The controller data storage can also include computer instructions to instruct the means for viewing to capture the image or the series of images 156; computer instructions to instruct the controller processor to determine a center of the captured image or series of images 158; computer instructions to instruct the controller processor to identify the certain frequency or certain frequencies 160; computer instructions to identify the certain shape of the first area reflecting light of the certain frequency or certain frequencies 162; and computer instructions to determine the location of the certain point within the image or series of images by locating the first area and using the location of the certain point defined relative to the location of the first area to form a first determined location of the certain point 164.

FIG. 3B shows the controller data storage 120 with computer instructions to determine the direction of the means for viewing by using the means for viewing longitude, the means for viewing latitude, the means for viewing height, the first determined location of the certain point, the magnification of the lens of the means for viewing, and the determined center of the captured image or series of images 166; computer instructions instructing the controller processor to identify the location area within the image or series of images by identifying the location area color within the image or series of images 174; computer instructions to determine a location of each of the plurality of location areas within the image or series of images by using the stored data file 176; computer instructions to determine the location of the certain point within the image or series of images to form a second determined location of the certain point 178; computer instructions to determine a pixel spacing within the image or series of images 182; and computer instructions to determine the magnification of the means for viewing by using the determined pixel spacing and the predefined location area dimensions 184.

The controller data storage 120 can also include a stored data file 168. The stored data file 168 can include a location of each of the location areas on the marker means 170 and a set of dimensions for each location area of a plurality of location areas 172.

FIG. 3C shows the controller data storage 120 including computer instructions to determine the direction of the means for viewing using the means for viewing longitude, the means for viewing latitude, the means for viewing height, the second determined location of the certain point, the determined center of the image or series of images, and the determined magnification 185.

The controller data storage 120 can also include a fail algorithm 186. The fail algorithm 186 can include computer instructions to determine that the means for viewing did not locate the marker means 188; computer instructions to determine that the means for viewing located the marker means at a location other than at the first location 190; and computer instructions to instruct the controller processor to initiate an alarm to repair the means for viewing, the marker means, or combinations thereof 192.

The controller data storage 120 can include computer instructions in the controller data storage to instruct the controller processor to use the inputted location data and the image or series of images with the identified pixels to determine which portions of the image or series of images to analyze to locate the marker means within the image or series of images 194.

Figure 4:
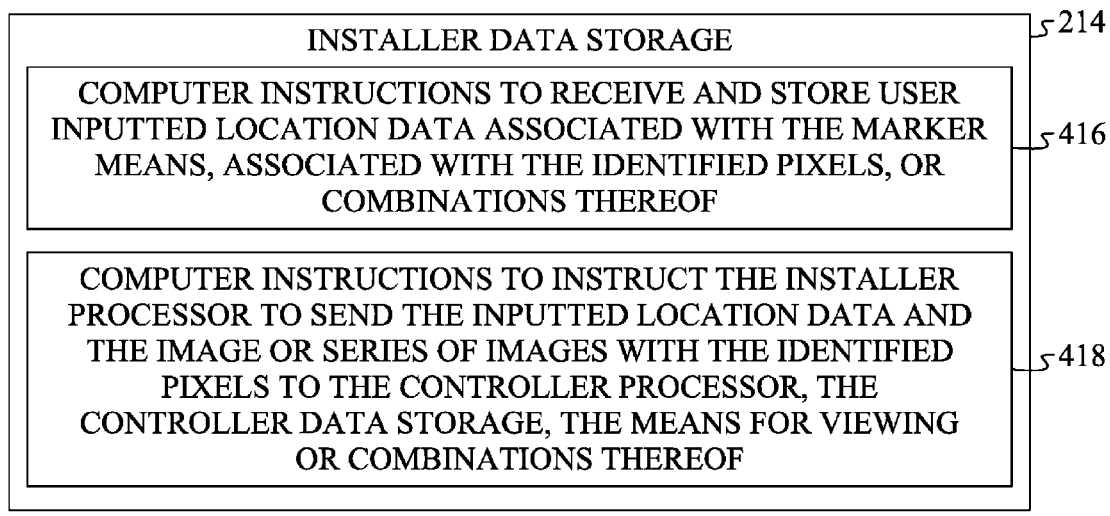
FIG. 4 is a diagram showing an installer data storage with computer instructions.

FIG. 4 depicts an embodiment of the installer data storage 214 with computer instructions.

The installer data storage 214 can have computer instructions to receive and store user inputted location data associated with the marker means, associated with the identified pixels, or combinations thereof 416 and computer instructions to instruct the installer processor to send the inputted location data and the image or series of images with the identified pixels to the controller processor, the controller data storage, the means for viewing or combinations thereof 418.

While these embodiments have been described with emphasis on the embodiments, it should be understood that within the scope of the appended claims, the embodiments might be practiced other than as specifically described herein.

What is claimed is:

1. A system for determining a direction and a magnification of a means for viewing, the system comprising:
   a. a means for viewing longitude, latitude, height, and a field of view, wherein the means for viewing captures an image or a series of images, and wherein each image or series of images comprises at least one pixel;
   b. a marker means disposed within the field of view, wherein the marker means comprises a certain point, wherein the certain point comprises a marker means longitude, a marker means latitude, and a marker means height, wherein the marker means comprises a first area of a certain shape and of at least one color, and wherein the first area reflects light at least one frequency; and
   c. a controller processor in communication with a controller data storage, wherein the controller processor is in communication with the means for viewing, and wherein the controller data storage comprises:
      (i) a data file comprising the means for viewing longitude, latitude, height, or combinations thereof;
      (ii) a second data file comprising the marker means longitude, the marker means latitude, the marker means height, a location of the first area, a location of the certain point defined relative to the location of the first area, or combinations thereof;
      (iii) computer instructions to instruct the means for viewing to capture the image or the series of images;
      (iv) computer instructions to instruct the controller processor to determine a center of the image or series of image;
      (v) computer instructions to instruct the controller processor to identify the at least one frequency;
      (vi) computer instructions to instruct the controller processor to identify the certain shape of the first area reflecting light at the at least one frequency;
      (vii) computer instructions to instruct the controller processor to determine a location of the certain point within the image or series of images by locating the first area and using the location of the certain point defined relative to the location of the first area to form a first determined location of the certain point; and
      (viii) computer instructions to instruct the controller processor to determine a direction of the means for viewing by using the means for viewing longitude, latitude, height, the first determined location of the certain point, a magnification of the means for viewing, and the determined center of the image or series of image.

2. The system of claim 1, wherein the marker means further comprises a first plurality of location areas, wherein each of the location area comprises:
   a. a location area color; and
   b. a predefined location area dimension, wherein the predefined location area dimension of each location area is different than the predefined location area dimension of other location areas, wherein each location area is spaced apart from other location areas, and wherein the controller data storage further comprises:

(i) a stored data file comprising a location on the marker means of each of the location areas and the predefined location area dimension for each location area;

(ii) computer instructions instructing the controller processor to identify the location area within the image or series of images by identifying the location area color within the image or series of images;

(iii) computer instruction to determine a location of each of the first plurality of location areas within the image or series of images using the stored data file;

(iv) computer instructions to determine the location of the certain point within the image or series of images to form a second determined location of the certain point, wherein the second determined location of the certain point is defined relative to the location of each of the first plurality of location areas within the image or series of images;

(v) computer instructions to determine a pixel spacing within the image or series of images, wherein the pixel spacing is defined relative to the predefined location area dimension of each location area to form a first determined pixel spacing;

(vi) computer instructions to determine the magnification of the means for viewing using the first determined pixel spacing and each predefined location area dimension; and (vii) computer instructions to determine the direction of the means for viewing using the means for viewing longitude, latitude, height, the second determined location of the certain point, the determined magnification, and the determined center of the image or series of images.

3. The system of claim 2, wherein the marker means further comprises a second plurality of location areas, wherein each of the location area comprises:

a. a second location area color; and b. a second predefined location area dimension, wherein the second predefined location area dimension of each location area is different than the predefined location area dimension of other location areas, wherein each location area is spaced apart from other location areas, and wherein the controller data storage further comprises:

(i) a second stored data file comprising a location on the marker means of each of the location areas of the second plurality of location areas and the second predefined location area dimension for each location area;

(ii) computer instructions instructing the controller processor to identify the location area within the image or series of images by identifying the second location area color within the image or series of images;

(iii) computer instruction to determine a location of each of the second plurality of location areas within the image or series of images using the second stored data file;

(iv) computer instructions to determine the location of the certain point within the image or series of images to form a third determined location of the certain point, wherein the third determined location of the certain point is defined relative to the location of each of the second plurality of location areas within the image or series of images;

(v) computer instructions to determine a second pixel spacing within the image or series of images, wherein the second pixel spacing is defined relative to the second predefined location area dimension of each location area to form a second determined pixel spacing;

(vi) computer instructions to determine the magnification of the means for viewing using the second determined pixel spacing and each second predefined location area dimension to form a second determined magnification; and (vii) computer instructions to determine the direction of the means for viewing using the means for viewing longitude, latitude, height, the third determined location of the certain point, the second determined magnification, and the determined center of the image or series of images.

4. The system of claim 3, wherein the first plurality of location areas are disposed at an angle from the second plurality of location areas.

5. The system of claim 1, further comprising a fail algorithm stored in the controller data storage, the fail algorithm comprising:

a. computer instructions to determine that the means for viewing did not locate the marker means;

b. computer instructions to determine that the means for viewing located the marker means at a location other than at the marker means longitude, the marker means latitude, and the marker means height; and c. computer instructions to instruct the controller processor to initiate an alarm to repair the means for viewing, the marker means, or combinations thereof.

6. The system of claim 5, further comprising an installer supervisory control computer, wherein the installer supervisory controller computer comprises:

a. an installer processor in communication with controller processor, the controller data storage, the means for viewing, or combinations thereof;

b. an installer data storage in communication with the installer processor;

c. a display, wherein the installer supervisory controller computer receives the image or series of images and displays the image or series of images on the display; and d. an input device to identify at least one pixel associated with the marker means or with a location of the marker means in the image or series of images.

7. The system of claim 6, further comprising:

a. computer instructions in the installer data storage comprising:

(i) computer instructions to receive and store user inputted location data associated with the marker means, associated with the identified pixels, or combinations thereof; and (ii) computer instructions to instruct the installer processor to send the inputted location data and the image or series of images with the identified pixels to the controller processor, the controller data storage, the means for viewing, or combinations thereof;

b. computer instruction in the controller data storage to instruct the controller processor to use the inputted location data and the image or series of images with the identified pixels to determine which portions of the image or series of images to analyze to locate the marker means within the image or series of images.

8. The system of claim 1, further comprising a lighting device for directing light onto the marker means.

9. The system of claim 1, wherein the marker means further comprises an electrical glow wire and the means for viewing further comprises an infrared sensor for sensing the electrical glow wire.

10. The system of claim 1, wherein the marker means is a flat geometrically shaped marker means, and wherein the first area has a highly reflective surface for reflecting the light at the at least one frequency.

11. A system for determining a direction and a magnification of a means for viewing, the system comprising:
 a. a means for viewing longitude, latitude, height, and a field of view, wherein the means for viewing captures an image or a series of images, and wherein each image or series of images comprises at least one pixel;
 b. a marker means disposed within the field of view, wherein the marker means comprises:
  (i) a certain point, wherein the certain point comprises a marker means longitude, a marker means latitude, and a marker means height; and
  (ii) a first area of a certain shape, wherein the first area comprises an electromagnetic radiation emitting device for emitting electromagnetic radiation at a certain frequency or at certain frequencies;
 c. a controller processor in communication with a controller data storage, wherein the controller processor is in communication with the means for viewing, and wherein the controller data storage comprises:
  (i) a data file comprising the means for viewing longitude, latitude, height, or combinations thereof;
  (ii) a second data file comprising the marker means longitude, the marker means latitude, the marker means height, a location of the first area, a location of the certain point defined relative to the location of the first area, or combinations thereof;
  (iii) computer instructions to instruct the means for viewing to capture the image or the series of images;
  (iv) computer instructions to instruct the controller processor to determine a center of the image or series of image;
  (v) computer instructions to instruct the controller processor to identify the certain frequency or certain frequencies;
  (vi) computer instructions to instruct the controller processor to identify the certain shape of the first area emitting light at the at least one frequency;
  (vii) computer instructions to instruct the controller processor to determine a location of the certain point within the image or series of images by locating the first area and using the location of the certain point defined relative to the location of the first area to form a first determined location of the certain point; and
  (viii) computer instructions to instruct the controller processor to determine a direction of the means for viewing by using the means for viewing longitude, latitude, height, the first determined location of the certain point, a magnification of the means for viewing, and the determined center of the image or series of image.

12. The system of claim 11, wherein the marker means further comprises a first plurality of location areas, wherein each of the location area comprises:
 a. a location area electromagnet radiation emitting device for emitting electromagnetic radiation at a certain frequency or certain frequencies;
 b. a predefined location area dimension, wherein the predefined location area dimension of each location area is different than the predefined location area dimension of other location areas, wherein each location area is spaced apart from other location areas, and wherein the controller data storage further comprises:
  (i) a stored data file comprising a location on the marker means of each of the location areas and the predefined location area dimension for each location area;
  (ii) computer instructions instructing the controller processor to identify the location area within the image or series of images by identifying the emitted electromagnetic radiation at the certain frequency or certain frequencies within the image or series of images;
  (iii) computer instruction to determine a location of each of the first plurality of location areas within the image or series of images using the stored data file;
  (iv) computer instructions to determine the location of the certain point within the image or series of images to form a second determined location of the certain point, wherein the second determined location of the certain point is defined relative to the location of each of the first plurality of location areas within the image or series of images;
  (v) computer instructions to determine a pixel spacing within the image or series of images, wherein the pixel spacing is defined relative to the predefined location area dimension of each location area to form a first determined pixel spacing;
  (vi) computer instructions to determine the magnification of the means for viewing using the first determined pixel spacing and each predefined location area dimension; and
  (vii) computer instructions to determine the direction of the means for viewing using the means for viewing longitude, latitude, height, the second determined location of the certain point, the determined magnification, and the determined center of the image or series of images.

13. The system of claim 12, wherein the electromagnetic radiation emitting device and the first location area electromagnet radiation emitting device are each selected from the group consisting of: an incandescent bulb, an light emitting diode "LED", a florescent bulb, a neon bulb, a halogen bulb, an LCD screen, a laser light or combinations thereof.

14. The system of claim 11, further comprising a fail algorithm stored in the controller data storage, the fail algorithm comprising:
 a. computer instructions to determine that the means for viewing did not locate the marker means;
 b. computer instructions to determine that the means for viewing located the marker means at a location other than at the marker means longitude, the marker means latitude, and the marker means height; and
 c. computer instructions to instruct the controller processor to initiate an alarm to repair the means for viewing, the marker means, or combinations thereof.

15. The system of claim 14, further comprising an installer supervisory control computer, wherein the installer supervisory controller computer comprises:
 a. an installer processor in communication with controller processor, the controller data storage, the means for viewing, or combinations thereof;
 b. an installer data storage in communication with the installer processor;
 c. a display, wherein the installer supervisory controller computer receives the image or series of images and displays the image or series of images on the display; and d. an input device to identify at least one pixel associated with the marker means or with a location of the marker means in the image or series of images.

16. The system of claim 15, further comprising:
a. computer instructions in the installer data storage comprising:
   (i) computer instructions to receive and store user inputted location data associated with the marker means, associated with the identified pixels, or combinations thereof; and
   (ii) computer instruction to instruct the installer processor to send the inputted location data and the image or series of images with the identified pixels to the controller processor, the controller data storage, the means for viewing, or combinations thereof;
b. computer instruction in the controller data storage to instruct the controller processor to use the inputted location data and the image or series of images with the identified pixels to determine which portions of the image or series of images to analyze to locate the marker means within the image or series of images.

17. A system for determining a direction and a magnification of a means for viewing, the system comprising:
a. a means for viewing disposed at a first location, wherein the means for viewing has a field of view and captures an image or a series of images, and wherein each image or series of images comprises at least one pixel;
b. a marker means disposed within the field of view, wherein the marker means comprises:
   (i) a certain point disposed at a second location; and
   (ii) a first area of a certain shape and of at least one color, and wherein the first area reflects light at least one frequency;
c. a controller processor in communication with a controller data storage, wherein the controller processor is in communication with the means for viewing, and wherein the controller data storage comprises:
   (i) a data file comprising the first location, the second location, a location of the first area, a location of the certain point defined relative to the location of the first area, or combinations thereof;
   (ii) computer instructions to instruct the means for viewing to capture the image or the series of images;
   (iii) computer instructions to instruct the controller processor to determine a center of the image or series of image;
   (iv) computer instructions to instruct the controller processor to identify the at least one frequency;
   (v) computer instructions to instruct the controller processor to identify the certain shape of the first area reflecting light at the at least one frequency;
   (vi) computer instructions to instruct the controller processor to determine a location of the certain point within the image or series of images by locating the first area and using the location of the certain point defined relative to the location of the first area to form a first determined location of the certain point; and
   (vii) computer instructions to instruct the controller processor to determine a direction of the means for viewing using the first location, the first determined location of the certain point, a magnification of the means for viewing, and the determined center of the image or series of image.

18. The system of claim 17, further comprising a fail algorithm stored in the data storage, the fail algorithm comprising:
a. computer instructions to determine that the means for viewing did not locate the marker means;
b. computer instructions to determine that the means for viewing located the marker means at a location other than at the first location; and
c. computer instructions to instruct the controller processor to initiate an alarm to repair the means for viewing, the marker means, or combinations thereof.

19. The system of claim 14, further comprising an installer supervisory control computer, wherein the installer supervisory controller computer comprises:
a. an installer processor in communication with controller processor, the controller data storage, the means for viewing, or combinations thereof;
b. an installer data storage in communication with the installer processor;
c. a display; wherein the installer supervisory controller computer receives the image or series of images and displays the image or series of images on the display; and
d. an input device to identify at least one pixel associated with the marker means or with a location of the marker means in the image or series of images.

20. The system of claim 15, wherein the system further comprises:
a. computer instructions in the installer data storage comprising:
   (i) computer instructions to receive and store user inputted location data associated with the marker means, associated with the identified pixels, or combinations thereof; and
   (ii) computer instruction to instruct the installer processor to send the inputted location data and the image or series of images with the identified pixels to the processor, the controller data storage, the means for viewing or combinations thereof;
b. computer instruction in the controller data storage to instruct the controller processor to use the inputted location data and the image or series of images with the identified pixels to determine which portions of the image or series of images to analyze to locate the marker means within the image or series of images.

* * * * *